(12) United States Patent
Kautz et al.

(10) Patent No.: US 12,650,490 B2
(45) Date of Patent: Jun. 9, 2026

(54) DATA PACKET NETWORK FOR IN-VEHICLE SPEED ENFORCEMENT SYSTEM

(71) Applicant: Applied Concepts, Inc., Richardson, TX (US)

(72) Inventors: Russell D. Kautz, Lewisville, TX (US); Wael Ghanma, Irving, TX (US); Stanley A. Walker, Flower Mound, TX (US); Devin L. Kautz, Melissa, TX (US); Jeff Loudan, Garland, TX (US)

(73) Assignee: APPLIED CONCEPTS, INC., Richardson, TX (US)

( * ) Notice: Subject to any disclaimer, the term of this patent is extended or adjusted under 35 U.S.C. 154(b) by 0 days.

(21) Appl. No.: 19/295,344

(22) Filed: Aug. 8, 2025

(65) Prior Publication Data

US 2026/0043894 A1 Feb. 12, 2026

Related U.S. Application Data

(60) Provisional application No. 63/680,832, filed on Aug. 8, 2024.

(51) Int. Cl.
| | |
|---|---|
| *G01S 7/03* | (2006.01) |
| *G01S 7/00* | (2006.01) |
| *G01S 13/58* | (2006.01) |

(52) U.S. Cl.
CPC ............... *G01S 7/03* (2013.01); *G01S 7/003* (2013.01); *G01S 13/58* (2013.01)

(58) Field of Classification Search
CPC .......... G01S 13/931; G01S 7/03; G01S 7/003; G01S 13/58
See application file for complete search history.

(56) References Cited

U.S. PATENT DOCUMENTS

| | | | | |
|---|---|---|---|---|
| 6,798,374 | B1 * | 9/2004 | Smith ..................... | G01S 13/92 |
| | | | | 342/194 |
| 10,627,480 | B2 * | 4/2020 | Nayyar ................... | G01S 13/42 |
| 10,663,571 | B2 * | 5/2020 | Halbert ................. | G01S 13/003 |
| 11,422,249 | B2 * | 8/2022 | Roger ................... | G01S 13/584 |
| 11,693,107 | B2 * | 7/2023 | Rajendran ............... | G01S 13/42 |
| | | | | 342/112 |
| 12,175,712 | B2 * | 12/2024 | Nugraha ................. | G01S 13/58 |
| 12,429,555 | B2 * | 9/2025 | Maher ................... | G01S 7/4017 |
| 2015/0153445 | A1 * | 6/2015 | Jansen ................... | G01S 7/032 |
| | | | | 342/195 |
| 2015/0260840 | A1 * | 9/2015 | Shelton ................. | G01S 13/589 |
| | | | | 342/195 |
| 2016/0041256 | A1 * | 2/2016 | Schofield, III ........ | G01S 13/931 |
| | | | | 342/70 |
| 2016/0223645 | A1 * | 8/2016 | Kim ..................... | G01S 13/345 |

(Continued)

*Primary Examiner* — Peter M Bythrow

(74) *Attorney, Agent, or Firm* — Jackson Walker LLP; Christopher J. Rourk

(57) ABSTRACT

A system for digital data packet communications for an in-vehicle speed enforcement system, comprising a first antenna configured to transmit a first radar signal and to receive a first reflected signal, a second antenna configured to transmit a second radar signal and to receive a second reflected signal, the first antenna coupled to the second antenna and configured to generate synchronized waveform data and a radar engine system configured to receive the synchronized waveform data and to generate a synchronization command.

20 Claims, 4 Drawing Sheets

(56) References Cited

U.S. PATENT DOCUMENTS

| | | | | |
|---|---|---|---|---|
| 2018/0172813 | A1* | 6/2018 | Rao | G01S 13/343 |
| 2019/0107618 | A1* | 4/2019 | Shelton | G01S 13/87 |
| 2019/0146079 | A1* | 5/2019 | Lundgren | G01S 13/524 |
| | | | | 342/115 |
| 2019/0178983 | A1* | 6/2019 | Lin | G01S 13/003 |
| 2019/0293755 | A1* | 9/2019 | Cohen | G01S 7/295 |
| 2019/0319722 | A1* | 10/2019 | Yu | H04L 27/0014 |
| 2020/0103499 | A1* | 4/2020 | Preece | G06N 3/045 |
| 2020/0341134 | A1* | 10/2020 | Roger | G01S 7/352 |
| 2022/0065986 | A1* | 3/2022 | Vaucher | G01S 13/0209 |
| 2023/0314562 | A1* | 10/2023 | van Houtum | G01S 13/878 |
| | | | | 342/175 |
| 2024/0310474 | A1* | 9/2024 | Moriera | G01S 7/032 |
| 2024/0385282 | A1* | 11/2024 | Stefanatos | G01S 13/931 |
| 2025/0093498 | A1* | 3/2025 | Shabtay | G01S 13/881 |
| 2025/0172682 | A1* | 5/2025 | Shabtay | G01S 13/931 |
| 2025/0271539 | A1* | 8/2025 | Poguntke | G01S 13/345 |

* cited by examiner

DATA PACKET NETWORK FOR IN-VEHICLE SPEED ENFORCEMENT SYSTEM

RELATED APPLICATIONS

This application claims benefit of and priority to U.S. provisional patent application No. 63/680,832, filed on Aug. 8, 2024, which is hereby incorporated by reference for all purposes as if set forth herein in its entirety.

TECHNICAL FIELD

The present disclosure relates generally to speed detection, and more specifically to a system and method for providing a data packet network for internal and external connections for an in-vehicle speed enforcement system.

BACKGROUND OF THE INVENTION

Police speed detection radar units are used to detect the speed of vehicles.

SUMMARY OF THE INVENTION

A system for digital data packet communications for an in-vehicle speed enforcement system is disclosed that includes a first antenna configured to transmit a first radar signal and to receive a first reflected signal. A second antenna is configured to transmit a second radar signal and to receive a second reflected signal. The first antenna is coupled to the second antenna and the coupled antennas are configured to generate synchronized waveform data. A radar engine system is configured to receive the synchronized waveform data and to generate a synchronization command.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
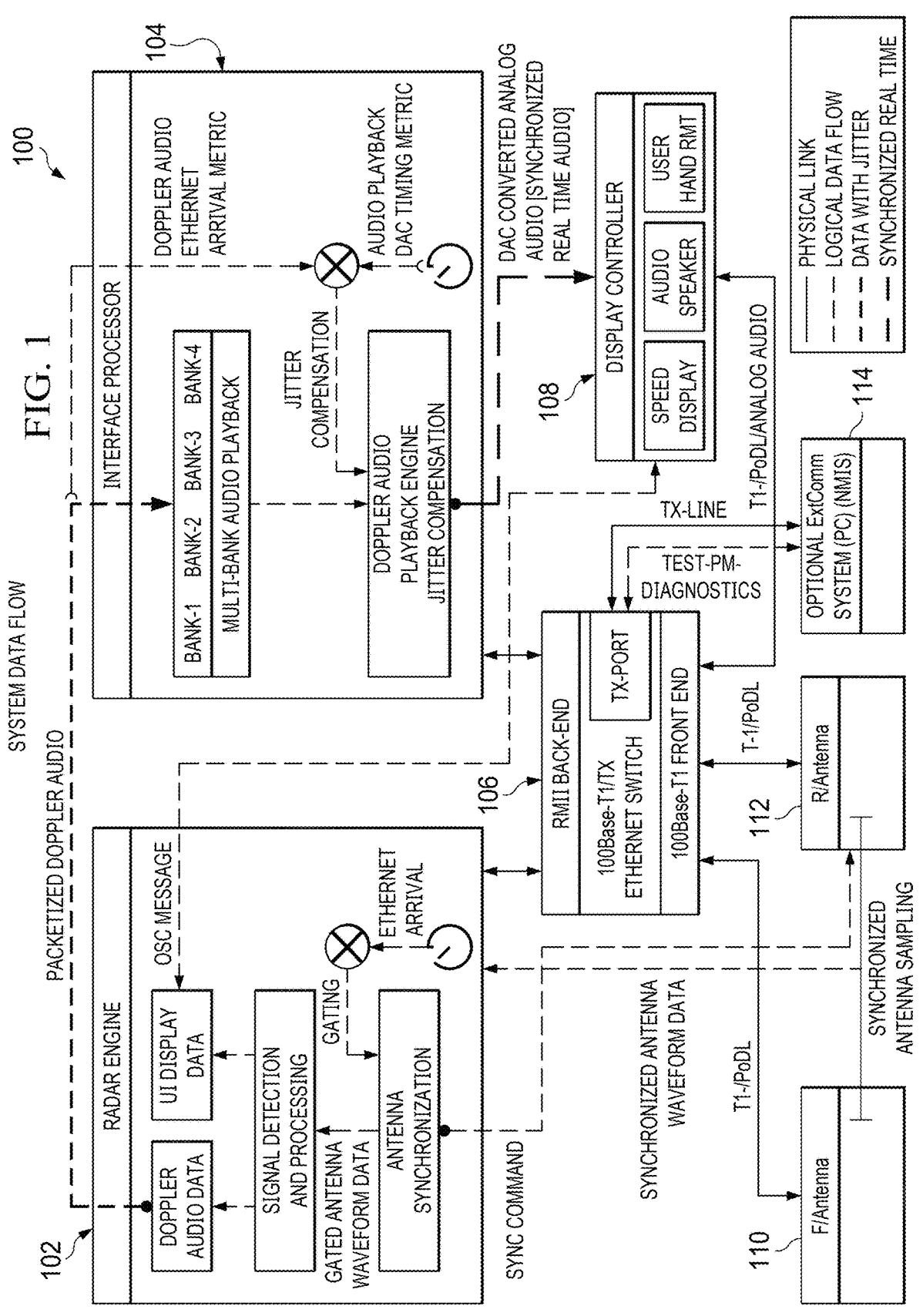
FIG. 1 is a diagram of system for a data packet network for in-vehicle speed enforcement system, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

This application claims benefit of and priority to U.S. provisional patent application No. 63/680,832, which is hereby incorporated by reference for all purposes as if set forth herein in its entirety.

Continuous-wave speed detection radar, pulsed-wave radar, LIDAR and other similar radar or LIDAR devices (which are referred to herein generally as "radar" without limitation to only radar unless otherwise specified) typically utilize a radar engine that is implemented as one or more algorithms that operate in a data processor, and which receives and processes analog and/or digitized analog radar data. A transport layer can serve as a communication interface between the radar engine and an Ethernet-based or other suitable networking hardware, to allow radar data and associated metadata to be sent and received reliably and in a timely manner. In this manner, peer system components such as displays, data devices, centralized storage radar data repositories and other system components can use Ethernet or other suitable network hardware as the physical layer, and the User Datagram Protocol (UDP) or other suitable data networking protocols as the transport layer.

Connectivity can thus be provided between the radar engine and each of the other system components in this manner. It is also possible to activate direct connectivity between the other system components without the involvement of the radar engine for processing associated with radar data, if needed.

Transport control protocol (TCP) transport can coexist with UDP if needed, with some logical links using TCP and others using UDP. UDP can be selected a-priori (such as at compile-time) as the transport layer protocol for communication links, or other suitable transport layer protocols or combinations of protocols can be chosen. All data links can be configured to support unidirectional data communications, bidirectional data communications or other suitable data communication such as full duplex communications.

One objective of the present disclosure is to relieve a legacy radar engine of any requirement to be configured for a specific data transmission protocol, and how the data is transmitted to or received from the radar antennas or other system components. Another objective is to allow for alternative data transport types (such as Wi-Fi), alternative hardware (such as new or different Ethernet hardware), a new software component (such as a new TCP/IP stack) or other such changes without affecting the radar engine or the transport layer core software architecture itself.

The present disclosure describes systems and methods that can be implemented using object-oriented programming, but can also or alternatively use flow charts, state diagrams, ladder diagrams or other suitable programming paradigms that provide clear delineation of functionality. Example embodiments may be described herein using pseudocode in a C-language format, for example using data structure encapsulation to achieve inheritance, and function-pointer members within data structures to emulate polymorphic behavior. The present disclosure is thus conducive to transitioning to C++ in the future.

In one example embodiment, the physical layer transmission can be implemented as 100BASE-T1 Ethernet, which provides a point-to-point topology on which full-duplex transmission can be accomplished by PAM3 encoding (3-Level Pulse Amplitude Modulation) over a single twisted pair of wires. Likewise, other suitable embodiments can also or alternatively be used.

The present disclosure also provides for real-time audio processing with asynchronous Ethernet as the underlying physical transport mechanism, using control algorithms at different stages of the system data flow to synchronize the rate of transmission of multiple antennas and to compensate for jitter at the audio output of the radar engine. Such real-time audio processing is important for generation of audio data for notification of operators of radar speed detection systems or for other suitable purposes.

The transport layer can be used to reliably transport time-critical data from one component of the system to another where it is needed. It can also be used to reliably transport non-time-critical data between the different components of the system. With the aid of synchronization messages originated by a control algorithm and delivered to the antennas and other system components, the transport layer can be used to provide system-wide synchronized delivery of sampled audio waveform data and other suitable data from the antennas to other system components on the network. The transport layer can also handle delivery of non-time-critical data from the radar engine to the antennas, such as antenna control data, synchronization messages, and other application-level messages.

FIG. 1 is a diagram of system 100 for a data packet network for in-vehicle speed enforcement system, in accordance with an example embodiment of the present disclosure. System 100 includes radar engine 102, interface processor, 104, RMI backend 106, display controller 108, front antenna 110, rear antenna 112 and external communication system 114, each of which can be implemented in hardware or a suitable combination of hardware and software. System 100 can be used to provide physical interconnectivity and logical information flow between the system components.

Front antenna 110 and rear antenna 112 are configured to transmit a radar signal to the environment and the receive reflected signals that are processed to detect vehicles and to determine the speed of the vehicles, such as for law enforcement purposes or other suitable purposes. Front antenna 110 and rear antenna 112 can sample audio-frequency data using a Serial Audio Interface (SAI) and can transmit the sampled waveform data over an Ethernet connection or other suitable media to radar engine 102 or other suitable systems or components. In one example embodiment, front antenna 110 and rear antenna 112 can be microwave antennas disclosed in U.S. Pat. No. 5,691,724, which is hereby incorporated by reference for all purposes as if set forth herein in its entirety, or other suitable antennas. Front antenna 110 and rear antenna 112 can include voltage-controlled oscillator (VCXO) circuitry and other suitable components.

Radar engine 102 can be implemented in hardware or a suitable combination of hardware and software, and can include suitable radar data processing systems and devices like those disclosed in U.S. Pat. No. 5,691,724 or other suitable systems and devices. Radar engine 102 is configured to receive waveform data over the Ethernet or other suitable media from one or both front antenna 110 and rear antenna 112, to process the data and to transmit the processed data to interface processor 104. In one example embodiment, radar engine 102 can process the data from front antenna 110 and rear antenna 112 sequentially in individual data words or structures, in a dedicated manner for a predetermined period, or in other suitable manners. Radar engine 102 can then forward the processed data of the signal processing algorithms to display controller 108 or other suitable systems or components.

Radar engine 102 can include an antenna synchronization system or function that receives synchronized antenna waveform data command from front antenna 110 and rear antenna 112 and which outputs gated antenna waveform data to a signal detection and processing system or function.

In addition to audio-frequency waveform data, front antenna 110 and rear antenna 112 transmit control data (such as gain data and whether the waveform was clipped) to radar engine 102 for use in signal processing, computation of relevant speed from Doppler data signals and other suitable data as discussed and described herein.

Rear antenna 112 can be configured to receive synchronization messages from radar engine 102 to command it to adjust the VCXO circuitry, such as to follow a transmission rate of front antenna 110 as computed by a synchronization engine control loop of radar engine 102 or for other suitable purposes.

Interface processor 104 can be implemented in hardware or a suitable combination of hardware and software, and can include a multi-bank playback engine control loop to compensate for jitter in the arrival of Doppler audio-frequency data from radar engine 102. Compensation can be used to produce a real-time synchronized audible Doppler signal stream to the user or for other suitable purposes. In one example embodiment, a Doppler audio Ethernet arrival metric can be mixed with a audio playback digital to analog controller timing metric to generate a jitter compensation signal that is used to process a multi-bank audio playback signal, or other suitable processes can also or alternatively be used. The signal detection and processing system or function can output data to a Doppler audio data system or function and a user interface display data system or function. Ethernet arrival data can be received at a mixer and used to generate a signal for an antenna synchronization system or function that can generate a sync command that is provided to rear antenna 112.

Interface processor 104 can include banks 1 through 4 of audio playback data in a multibank audio playback system or process. An output from the multibank audio playback system or process can be provided to a Doppler audio playback engine jitter compensation system or function. The output of the Doppler audio playback engine jitter compensation system or function can be provided to display controller 108 as a digital to analog converter converted analog audio signal for synchronize real-time audio data.

Figure 2:
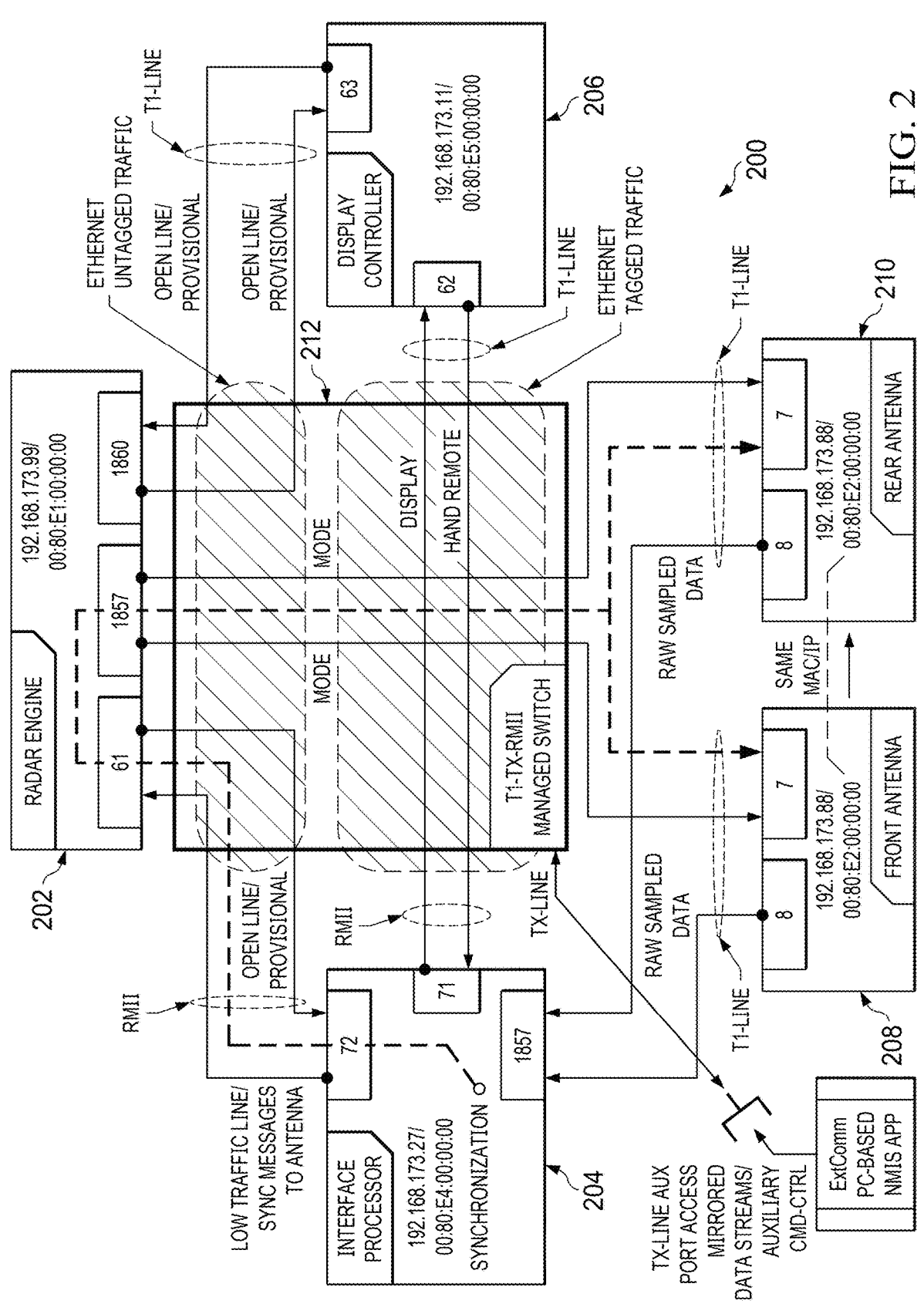
FIG. 2 is a diagram of a system for providing logical connectivity for a data packet network for in-vehicle speed enforcement system, in accordance with an example embodiment of the present disclosure.

FIG. 2 is a diagram of a system 200 for providing logical connectivity for a data packet network for in-vehicle speed enforcement system, in accordance with an example embodiment of the present disclosure. System 200 includes radar engine, 202, interface processor, 204, display controller 206, front antenna 208, rear antenna 210 and switch 212.

Communication between the different components can be handled by the data link session objects. A link session can be provisioned a priori (at compile-time) as using UDP, TCP or other suitable protocols. The system components can be connected using proprietary T-1 Ethernet cabling that supports power over data line (PODL) Ethernet or other suitable protocols. A reduced media independent interface (RMII) can be used between radar engine 202 and switch 212, between interface processor 204 and switch 212 or in other suitable locations. Sub-system components can be directly connected to switch 212, which can be resident on radar engine 202, which can be independent or can be implemented in other suitable manners.

If front antenna 208 and rear antenna 210 are externally connected to the system and are interchangeable by the customer, or if front antenna 208 and rear antenna 210 otherwise share the same hardware, the antennas can be assigned to the same MAC and IP while at the same time connected to the same IP network. Aliasing of the front and rear antenna can also be used to permit the factory to manufacture all antennas with the same MAC/IP, which can be used to allow any given antenna to be deployed as either front antenna 208 or rear antenna 210.

The identity of the antenna can be detected using an Ethernet tail-tagging method (where all Ethernet traffic from an antenna is tagged with the identity of the physical port to which the antenna is connected) or in other suitable manners. In this manner, radar engine 202 can be provided with the ability to distinguish the originating antenna of the data. Outbound Ethernet/IP traffic data from radar engine 202 can be tagged with the physical port identity of the destination antenna, which can be used to direct the Ethernet traffic to a specific physical port connected to either front antenna 208 or rear antenna 210.

The antennas can be assigned to their identity by radar engine 202 at startup or in other suitable manners. At startup, the antennas send a request-for-identity to radar engine 202 until radar engine 202 responds with an identity assignment message to each antenna. Upon receiving identity data, such as either front or rear (primary or secondary), the antenna can cease to transmit a request-for-identity and begin transmitting sample waveform audio-frequency data.

The antennas can also embed their identity into the waveform Ethernet packets to further identify the source of the data (such as originating from the front or rear antenna). In one example embodiment, antenna waveform data can be provided to systems other than the radar engine, such as mirrored antenna data sent to an external application used to monitor or test the system. In such a case the external application can use the antenna identity data from the antenna stream of data, such as when tail-tagging is only identifiable to the radar engine.

Antenna data can be transmitted over a UDP Ethernet link to the radar engine in IP packets that contain an application layer sequence number, such as to ensure in-order delivery of sampled audio data or for other suitable purposes. Upon receiving a full bank of data from each antenna, the radar engine can process data received from both antennas. Otherwise, radar data from individual antennas can be processed.

Radar engine 202 can receive low traffic line/sync messages from interface processor 204 and can generate an open line signal to interface processor 204. Radar engine 202 can receive an open line/provisional system from display controller 206 and can generate an open line/provisional signal to display controller 206. Switch 212 can transmit raw sample data from front antenna 208 and rear antenna 210 to interface processor 204. Switch 212 can also transmit display data from interface processor 204 to display controller 206 and can transmit hand remote data from display controller 206 to interface processor 204.

Figure 3:
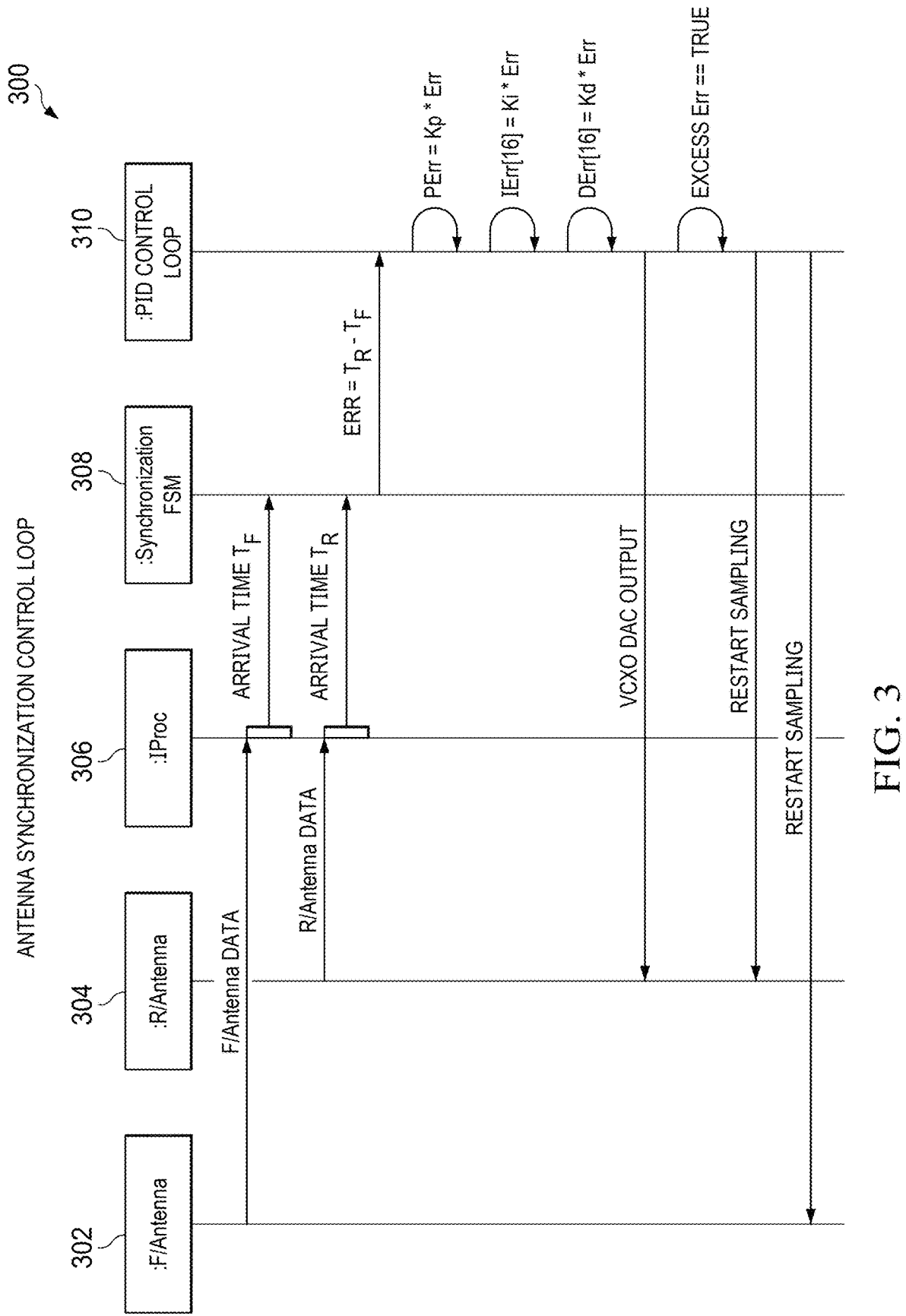
FIG. 3 diagram of is a process for antenna synchronization control, in accordance with an example embodiment of the present disclosure.

FIG. 3 is a diagram of process 300 for antenna synchronization control, in accordance with an example embodiment of the present disclosure. Process 300 can be implemented with front antenna 302, rear antenna 304, processor 306, synchronization finite state machine (FSM) 308, proportional-integral-derivative (PID) control loop 310 or other suitable systems and components.

Process 300 begins at 302, where rear antenna 304 receives control data from a radar engine or other suitable components to cause it to follow the sampling and transmission time of front antenna 302 or to perform other suitable functions. If front antenna 302 and rear antenna 304 traffic arrival time at the radar engine is monitored, synchronized operation can be utilized, such as by a control algorithm of the radar engine, to control the operation of rear antenna 304 transmission and sampling to be in-sync with front antenna 302.

Timing is important when receiving full banks of waveform data from front antenna 302 and rear antenna 304, both in the arrival time of data from both antennas, and in the processing time of this data by the radar engine. The transport layer can deliver banks of data to the radar engine in synchronized delivery (i.e. at the same time), and the radar engine can be configured to complete the processing of this data in a timely manner, such as before the next banks of data are received from each of the antennas. To achieve this synchronization, the transport layer can interact with the radar engine on a semaphore basis or in other suitable manners.

In one example embodiment, the synchronization control loop can use PID control loop 310 with a 16-element integral and 16-element differential damper or other suitable configurations. The most recent 16 errors or other suitable numbers can be used in the computation, with the differential having the opposite direction of the integral. The proportional element can be computed with the current iteration error. PID control loop 310 can be activated if the measured error exceeds a certain limit, at which point PID control loop 310 can iterate repeatedly for a set number of iterations. Once the error limit is reached, such as when the error is within the tolerable region, PID control loop 310 can cease to fire, and can be configured to resume when the error tolerance is exceeded again or under other suitable conditions.

In operation, front antenna data is transmitted from front antenna 302 to processor 306 and rear antenna data is transmitted from antenna 304 to processor 306. The arrival time of the front antenna data and the rear antenna data is transmitted from processor 306 to synchronization FSM 308. An error signal that equals the difference between the front and rear arrival time data is transmitted from synchronization FSM 308 to PID control loop 310, which generates PErr, IErr and DErr processes. A voltage controlled oscillator digital analog converter output is then generated and transmitted back to rear antenna 304 or other suitable systems. If there are excessive errors, then sampling restart signals are generated and transmitted from control loop 310 to front antenna 302 and rear antenna 304.

Figure 4:
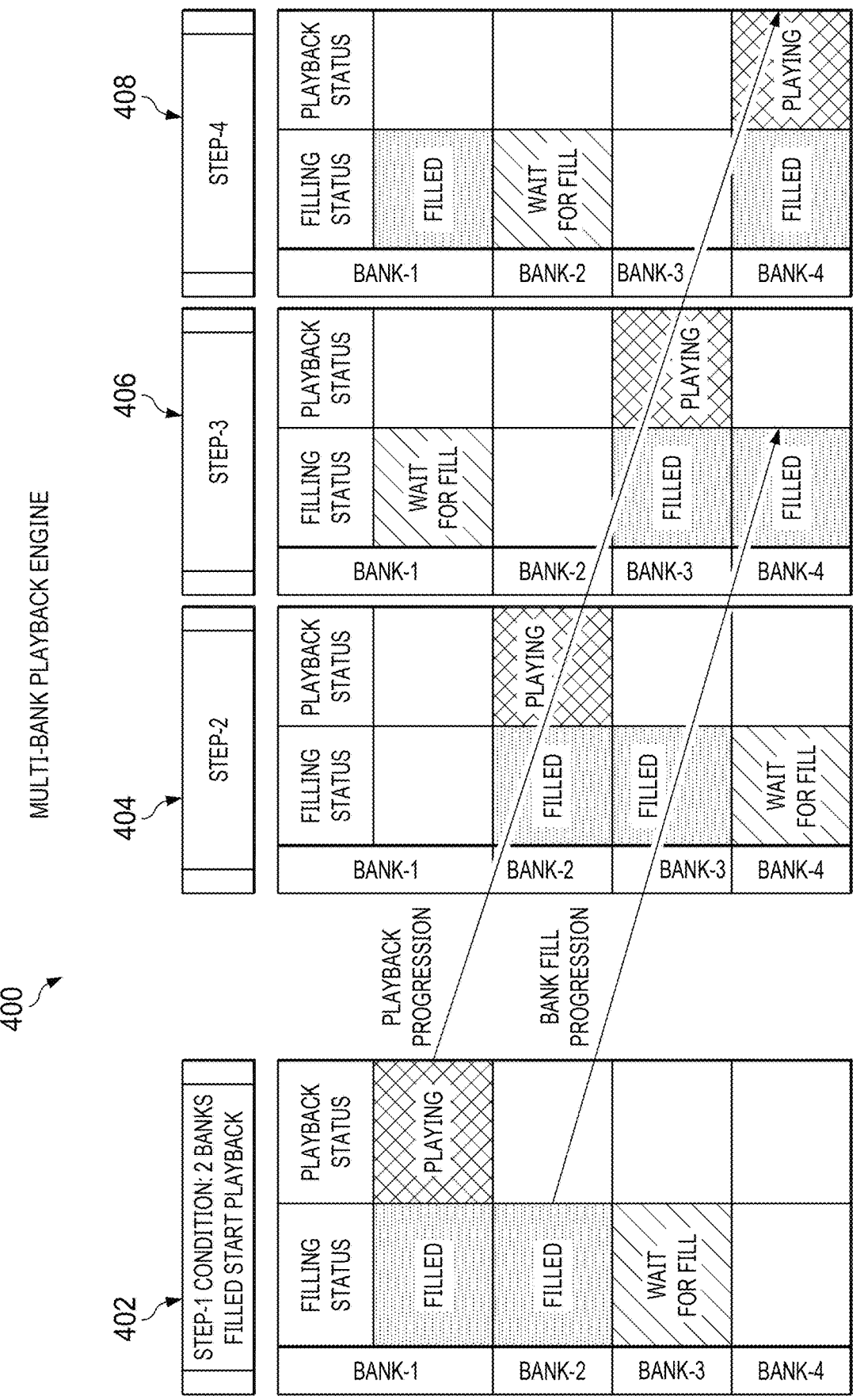
FIG. 4 is a diagram of process for multi-bank playback, in accordance with an example embodiment of the present disclosure.

FIG. 4 is a diagram of process 400 for multi-bank playback, in accordance with an example embodiment of the present disclosure. When antenna waveform data is synchronized and delivered by the transport layer to the radar engine in-tandem, such as when both the front and rear antenna data are delivered to the radar engine at the same time, there can still remain inherent jitter in this data between one delivery and the next.

To compensate for inherent jitter, which can be propagated to the output of signal processing, a multi-bank playback engine control loop can be used. Output Doppler audio frequency data can be deposited into banks of output audio before being played back. The playback rate and fill-rate of a multi-bank repository can be monitored and controlled to ensure avoidance of over-flow and under-flow between the fill and playback.

Playback timing can be computed at filling-time for each bank, such as at delivery-time from the transport layer or in other suitable manners. Each bank can have its own playback timer pre-scalar computation (PSC). A leaky integrator can be used to compute the playback timer PSC for each bank based on fill-time of the bank versus the expected fill-time. At actual playback time, the actual playback timer PSC can be adjusted according to the PSC computed for the bank to be played back.

At 402, step one is initiated when two banks are filled and playback is started. In one example of embodiment, bank one can be filled with audio data as a filling status and have a playback status of playing the audio data. Bank two can have a filled filling status for the audio data, and bank three can be receiving audio data and waiting to be filled. The process proceeds to step two 404, where banks two and three are filled with audio data, bank two is playing audio data and bank four is waiting to be filled with audio data. The process then proceeds to step three 406, where bank one is waiting for fill, banks three and four are filled and bank three is playing. The process proceeds to step four 404 where bank one is filled, bank two is waiting for fill, and bank four is filled with playing. The bank fill progression proceeds from step one to step three and the playback progression proceeds from step one to step four. In this manner, a round robin type process is used where a first bank is played back after a second bank is filled and while a third bank is filling, where a fourth bank can then be used to receive audio data while the second bank is playing and so forth.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more micro-computers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for digital data packet communications for an in-vehicle speed enforcement system, comprising:
    a first antenna configured to transmit a first radar signal and to receive a first reflected signal;
    a second antenna configured to transmit a second radar signal and to receive a second reflected signal;
    the first antenna coupled to the second antenna and configured to generate synchronized waveform data; and
    a radar engine system configured to receive the synchronized waveform data and to generate a synchronization command.

2. The system of claim 1 wherein the radar engine is configured to transmit the synchronization command to the first antenna.

3. The system of claim 1 wherein the radar engine is configured to generate gated antenna waveform data and to perform signal detection on the gated antenna waveform data.

4. The system of claim 1 wherein the radar engine is configured to generate packetized Doppler audio data and to transmit the packetized Doppler audio data to an interface processor.

5. The system of claim 1 wherein the radar engine is configured to generate packetized Doppler audio data and to transmit the packetized Doppler audio data to an interface processor, and the interface processor is configured to store the packetized Doppler audio data in a multi-bank audio playback system.

6. The system of claim 1 wherein the radar engine is configured to generate packetized Doppler audio data and to transmit the packetized Doppler audio data to an interface processor, and the interface processor is configured to perform jitter compensation on the packetized Doppler audio data.

7. The system of claim 1 wherein the radar engine is configured to generate packetized Doppler audio data and to transmit the packetized Doppler audio data to an interface processor, and the interface processor is configured to perform jitter compensation on the packetized Doppler audio data using a Doppler audio ethernet arrival metric.

8. The system of claim 1 wherein the radar engine is configured to generate a plurality of banks of packetized Doppler audio data and a multibank playback engine is configured to file the plurality of banks in a round-robin manner.

9. The system of claim 1 wherein the radar engine is configured to generate a first bank and a second bank of packetized Doppler audio data and to playback the first bank while the second bank is being filled.

10. The system of claim 1 wherein the radar engine is configured to generate a first bank, a second bank and a third bank of packetized Doppler audio data and to playback the first bank when the second bank is filled and the third bank is being filled.

11. A method for providing digital data packet communications for an in-vehicle speed enforcement system, comprising:
    transmitting a first radar signal from a first antenna and to receiving a first reflected signal;
    transmitting a second radar signal from a second antenna configured to receiving a second reflected signal;
    generating synchronized waveform data from the first antenna and the second antenna; and
    receiving the synchronized waveform data at a radar engine system and generating a synchronization command.

12. The method of claim 11 further comprising transmitting the synchronization command to the first antenna.

13. The method of claim 11 further comprising generating gated antenna waveform data and performing signal detection on the gated antenna waveform data.

14. The method of claim 11 further comprising generating packetized Doppler audio data and transmitting the packetized Doppler audio data to an interface processor.

15. The method of claim 11 further comprising:
    generating packetized Doppler audio data and transmitting the packetized Doppler audio data to an interface processor; and
    storing the packetized Doppler audio data in a multi-bank audio playback system.

16. The method of claim 11 further comprising:
    generating packetized Doppler audio data and transmitting the packetized Doppler audio data to an interface processor; and
    performing jitter compensation on the packetized Doppler audio data.

17. The method of claim 11 further comprising:
    generating packetized Doppler audio data and transmitting the packetized Doppler audio data to an interface processor; and
    performing jitter compensation on the packetized Doppler audio data using a Doppler audio ethernet arrival metric.

18. The method of claim 11 further comprising:
    generating a plurality of banks of packetized Doppler audio data; and
    file the plurality of banks in a round-robin manner.

19. The method of claim 11 further comprising:
    generating a first bank and a second bank of packetized Doppler audio data; and
    playing back the first bank while the second bank is being filled.

20. The method of claim 11 further comprising:
    generating a first bank, a second bank and a third bank of packetized Doppler audio data; and
    playing back the first bank when the second bank is filled and the third bank is being filled.

* * * * *